United States Patent [19]

Calhoun

[11] 4,084,686

[45] Apr. 18, 1978

[54] STARWHEEL CONTROL IN A SYSTEM FOR CONVEYING CONTAINERS

[75] Inventor: Fredrick L. Calhoun, Rolling Hills, Calif.

[73] Assignee: Industrial Dynamics Company, Ltd., Torrance, Calif.

[21] Appl. No.: 737,063

[22] Filed: Nov. 1, 1976

[51] Int. Cl.$^2$ .................. B65G 43/08; B65G 29/00
[52] U.S. Cl. ................... 198/468; 198/480; 198/572; 198/577; 198/857
[58] Field of Search ............. 198/460, 461, 468, 480, 198/481, 572, 612, 718, 723, 857, 577, 503; 193/32

[56] References Cited

U.S. PATENT DOCUMENTS

| | | | |
|---|---|---|---|
| 1,069,870 | 8/1913 | Gaynor | 198/468 |
| 2,599,220 | 6/1952 | Bergmann | 198/572 |
| 2,920,739 | 1/1960 | Woldin | 198/480 X |
| 2,985,283 | 5/1961 | Carter | 198/468 X |
| 3,286,814 | 11/1966 | Atkinson | 198/503 X |
| 3,441,120 | 4/1969 | McGill | 198/612 X |
| 3,952,856 | 4/1976 | Kurzweil et al. | 198/460 |
| 3,982,619 | 9/1976 | Sieverin et al. | 193/32 X |

*Primary Examiner*—Evon C. Blunk
*Assistant Examiner*—James L. Rowland
*Attorney, Agent, or Firm*—Charles H. Schwartz

[57] ABSTRACT

A torque motor is directly coupled to a starwheel in a system for conveying containers. The torque motor has the unique characteristics of generating a constant torque while operating at the speeds of the starwheel between standstill and the maximum speed at which the containers are conveyed on the conveyor line. The torque motor normally produces a sufficient torque in a direction to overcome the running friction of the starwheel system, thereby causing the starwheel to be effectively a frictionless freewheeling device under all operating conditions.

A detector is disposed at a position along the conveyor line in front of the starwheel. The torque from the motor is reversed to produce a braking action on the starwheel when the detector indicates an interruption in the conveyance of the containers. The braking of the starwheel to a standstill is timed so that a particular number of containers (the prime) remain between the detector and the starwheel.

When the conveyance of containers is initiated again, the torque motor is energized for a particular period of time to produce a torque greater than that normally provided to overcome the running friction of the starwheel. This causes the containers in the prime to be accelerated so that a graceful melding is produced between these containers and the containers on the other side of the detector.

The combined advantages of the torque motor drive and associated controls are a minimizing of container impact in the conveyor line, prevention of container jamming at infeed of the starwheel system and a condition of smoother and unimpeded flow of containers in the line.

20 Claims, 4 Drawing Figures

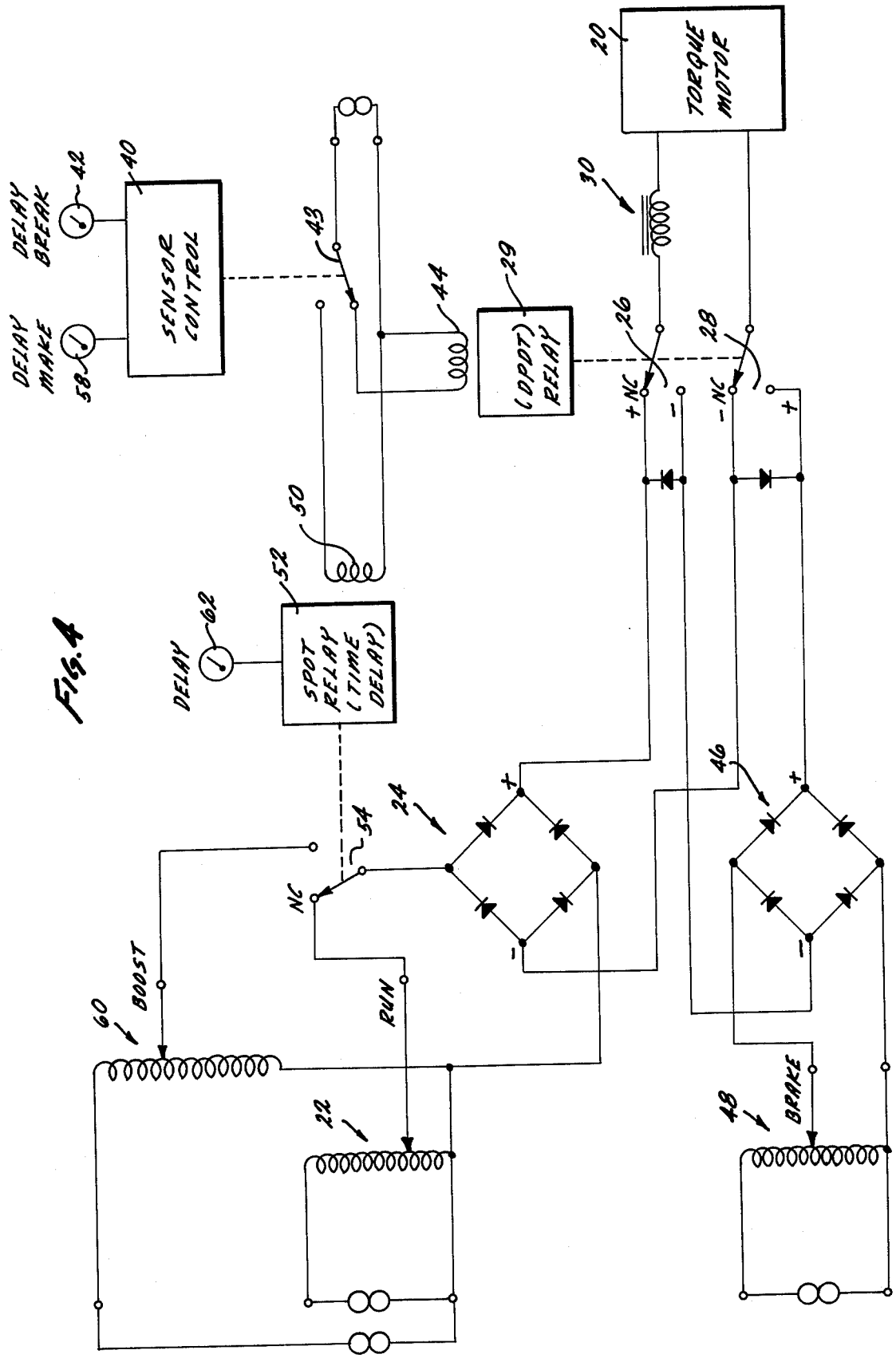

STARWHEEL CONTROL IN A SYSTEM FOR CONVEYING CONTAINERS

This invention relates to apparatus for controlling containers such as glass bottles on a high-speed production conveyor line. More particularly, the invention relates to apparatus for controlling the transfer of containers through a starwheel on the conveyor line to minimize container impact, prevent jamming on the starwheel infeed and not impede container flow. The invention is also concerned with apparatus for insuring that the containers are handled properly during their transfer through the starwheel when movement of the containers along the conveyor line is stopped and started repeatedly.

When containers are inspected in production, they are often conveyed along a conveyor line to a starwheel. The starwheel is constructed to receive the containers in sequence in successive pockets as the starwheel rotates. The containers are then moved past a station which performs the inspection operations on the containers such as detection of foreign particles or the amount of content in the containers. The containers are then transferred back to the conveyor line, if they are acceptable.

The starwheels have been operated to two distinct modes in the past. In one mode, the starwheel has been positively driven by an AC or DC motor with speed reducer at a fixed velocity corresponding to the rate at which the containers are moved along the conveyor line to the starwheel. This mode of operation has presented problems because it has been difficult to synchronize the movements of the starwheel with the movements of the containers along the conveyor line, particularly since the conveyor lines vary in speed and the container spacing and flow are not uniform on the line. This has not only presented problems of starwheel-to-container synchronization but has also presented problems in motor construction and operation since the motor has to operate efficiently over a wide range of speeds and further has to be operated at variable speeds in synchronism with the movement of the containers along the conveyor line. As will be appreciated it has been difficult to provide a conventional motor-driven starwheel with the proper characteristics.

In the second mode, the starwheel has been moved by the containers at a speed dependent only upon the speed of the containers along the conveyor line. In this mode, the movement of the starwheel has been freewheeling. However, the freewheeling mode has presented difficulties since the starwheel experiences considerable friction and starting inertia and the containers pressing against the starwheel on the conveyor line have to overcome these forces. This has hindered the synchronous movement of the starwheel in accordance with the movement of the containers along the conveyor line to the starwheel. As a result, a compromise must be made in the operation of the freewheeling starwheel. A prime of bottles must be maintained in the starwheel at all times or the next group of bottles feeding into the starwheel will often jam if they hit the teeth instead of nesting into the pockets. Maintaining the prime requires additional friction drag or a brake on the starwheel. This causes excessive back up in front of the starwheel and impedes line flow. This is especially critical or short coupled lines. Also, since the prime bottles are not moving, the next group of bottles hit them with considerable impact, causing breakage in may cases and jamming of the bottles in the starwheel.

Considerable effort has been made to solve the problem of producing a synchronous movement between the starwheels and the containers moving along the conveyor line to the starwheels. This effort has ocurred over a period of several decades since lines for handling containers at high speeds have now been in use for that period of time. In spite of this effort, no one has been able to provide a satisfactory solution of these problems until the present.

The invention provides a system which overcomes the difficulties specified above. In one embodiment of the invention, a torque motor is directly coupled to the starwheel in the normal mode of operation to produce a force on the starwheel in a direction for overcoming the friction forces in the system. In this way, the starwheel is freewheeling as a practical matter and is easily rotated by the containers moving along the conveyor line to the starwheel. The torque motor has the unique characteristics to operate at a constant torque, without becoming overheated, at speeds of the starwheel between standstill and the maximum speed of movement of the containers.

Means are also associated with the torque motor-driven starwheel to provide additional advantages. For example, a detector is disposed on the upstream side of the conveyor relative to the starwheel to detect the movement of the containers toward the starwheel. When the detector indicates an interruption in the movement of containers along the conveyor line toward the starwheel, the torque motor is energized in the opposite direction to normal rotation so that it effectively serves as a brake on the starwheel. The timing of this braking operation is controlled so that only a predetermined number of containers are disposed in the conveyor line ahead of the starwheel when the starwheel is braked to a halt. This predetermined number of containers is designated in the art as "the prime". The prime is necessary since an unprimed or empty starwheel will often jam when containers are fed into it in a random fashion because the containers do not always mesh directly into the starwheel pocket but hit the point between the pockets. The number of containers in the prime is preselected based on line conditions in the production plant.

The detector also indicates when containers have moved past the detector after the movement of the containers in the conveyor line has been again initiated. When this occurs, the torque motor is momentarily energized in the forward direction with a driving force greater than that normally produced to overcome the running friction of the system. This momentary surge causes the containers in the prime to accelerate the starwheel to a speed approaching the speed at which the containers are moving along the conveyor line toward the prime. In this way, a graceful melding occurs between the containers in the prime and the containers on the conveyor line so that minimum container impact is achieved, thus reducing container breakage and jamming.

In the drawings:

FIG. 4 is a circuit diagram showing the electrical features in one embodiment of the invention.

Figure 1:
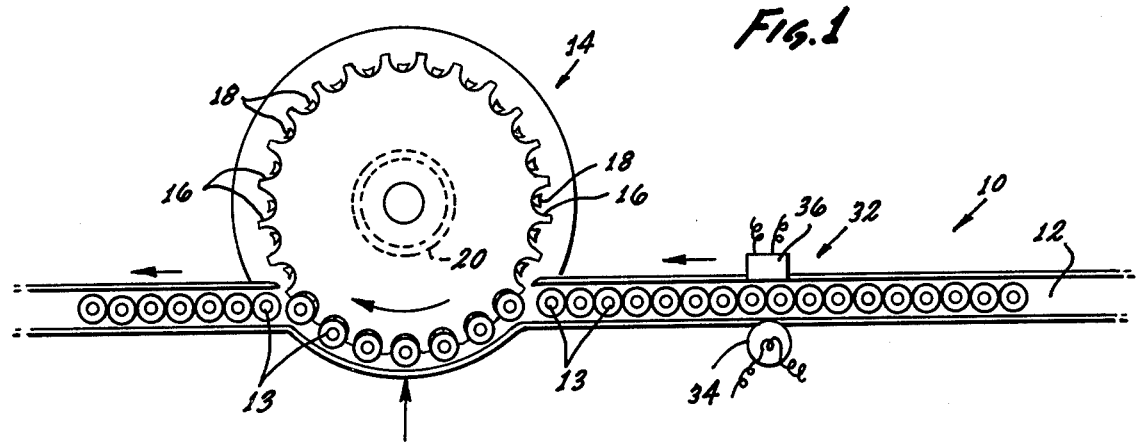
FIG. 1 is a top plan view of a conveyor line and a starwheel in the conveyor line for moving containers such as bottles past an output station such as a station for inspecting the containers.

In one embodiment of the invention, a conveyor line generally indicated at 10 is provided. The conveyor line may be constructed in a normal manner and may be provided with a chain 12 to move containers 13 such as bottles along the conveyor line toward a starwheel generally indicated at 14. The starwheel 14 may be also constructed in a conventional manner and may be provided with pockets 16 uniformly disposed around the annular periphery of the starwheel and shaped to receive containers moved in sequence by the conveyor line to the starwheel. The starwheel may be provided with a resilient cup 18 in each pocket for holding in fixed position a container in that pocket. A vacuum may be introduced to each other of the cups 18 in a conventional manner to facilitate the retention of the container in the pocket against the cup. The vaccum in the cups 18 is released at a particular time so that the containers become returned from the starwheel 14 to the conveyor 10 on the downstream side of the starwheel.

Figure 2:
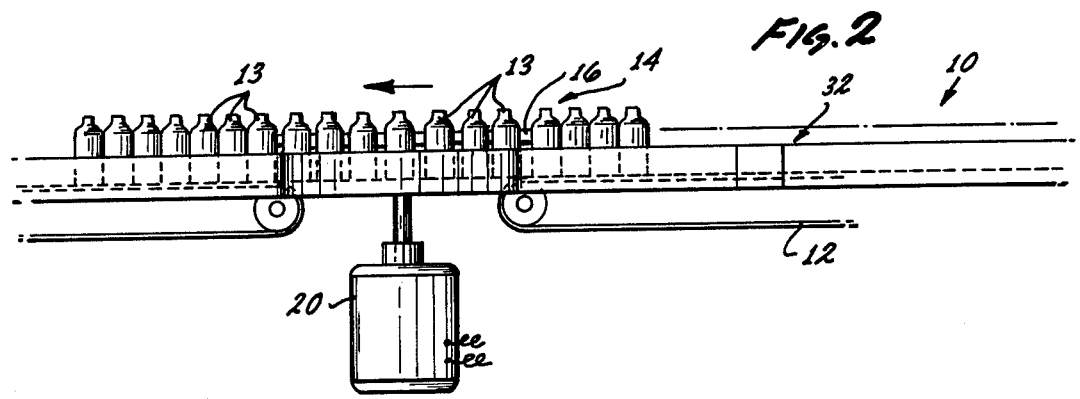
FIG. 2 is a front elevational view of the starwheel and a torque motor included within this invention.

A torque motor 20 (FIG. 2) is directly coupled to the starwheel 14. The torque motor may be constructed in a conventional manner. It may constitute a special type DC motor with powerful permanent magnets on the stator and with windings formed on the rotor from large wires. The windings on the rotor are coupled magnetically through air to the permanent magnets on the stator. The torque motor is able to operate efficiently at a constant torque output without overheating at various speeds of the starwheel between standstill and the maximum speed at which the starwheel is rotated by the movement of the containers in the conveyor line 10.

The torque motor 20 may receive from a variable autotransformer 22 and rectifier 24 combination (FIG. 4) a direct voltage of sufficient magnitude to overcome the running friction of the starwheel 14. In this way, the starwheel 14 effectively operates on a freewheeling basis so that it is rotated by the containers at a speed corresponding to the speed at which the containers are moving along the conveyor line. The direct voltage introduced to the torque motor 20 is obtained from a circuit including the transformer 22, a rectifier generally indicated at 24, ganged switches 26 and 28 and an inductive filter generally indicated at 30. The movable contacts of the switches are normally disposed in their upper portions by the energizing of a relay 29.

Figure 3:
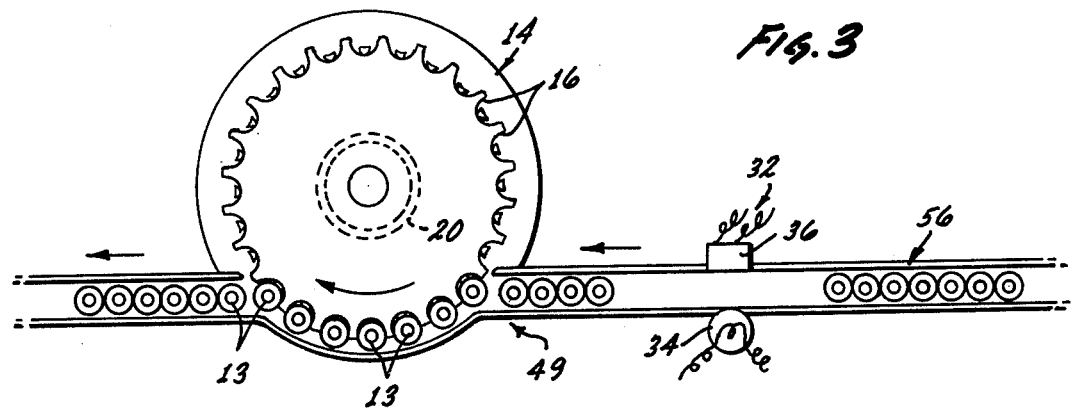
FIG. 3 is a top elevational view similar to that of FIG. 1 and shows the positions of the containers relative to the starwheel and the conveyor line when the movement of the containers along the conveyor line had been interrupted.

A sensor generally indicated at 32 (FIGS. 1 and 3) is disposed at a position on the conveyor line ahead of the starwheel 14 in the direction of movement of the containers to sense the movement of the containers along the conveyor line 10. The sensor may comprise a source of light 34 on one side of the conveyor line. The photocell 36 normally does not produce a signal as the containers are moved in sequence along the conveyor line toward the starwheel 14 because the containers block the passage of light from the source 34 to the photocell 36. However, when an interruption occurs in the movement of the containers along the conveyor line, a signal is produced by the photocell 36 to indicate such interruption.

During the time that the photocell 36 is not being energized, it causes a sensor control 40 to remain unenergized. However, when the photocell 36 becomes energized, it causes the control to become energized after a delay dependent upon a delay break 42. The delay break is adjustable to control the period of time between the interruption in the movement of the containers along the conveyor line 10 and the energizing of the control 40. When the control 40 becomes energized, it energizes a relay (not shown) in the control and this relay actuates the movable arm of a switch 43 into engagement with the upper stationary contact of the switch. This causes a circuit to a solenoid 44 to be interrupted so that the relay 29 becomes interrupted and the movable arms of the ganged switches 26 and 28 are released into engagement with the lower stationary contacts of the switches.

When the movable contacts of the switches 26 and 28 engage the lower stationary contacts of the switches, a circuit is established for introducing a direct voltage to the torque motor 20 in a direction for braking the starwheel. The circuitry is established through a fullwave rectifier generally indicated at 46 from a variable autotransformer generally indicated at 48. This circuit is established at such a delayed time that the torque motor 20 is braked to a stop when a particular number of containers constituting the prime are disposed on the conveyor line between the sensor 32 and the starwheel 14. The prime is generally indicated at 49 in FIG. 3.

The energizing of the control 40 also causes a continuous circuit to be established to a solenoid 50. This solenoid in turn energizes a relay 52, which causes the movable arm of a switch 54 to be actuated into engagement with the right stationary contact in FIG. 4. This causes the energizing circuit for the motor 20 to be prepared for operation when the movable contacts of the switches 26 and 28 are again actuated into engagement with the upper stationary contacts in FIG. 4. This occurs when movement of the containers generally indicated at 56 in FIG. 3 is again initiated on the conveyor line and the first group of these containers is moved past the sensor 32. At such a time, the movable contact of the switch 43 returns into engagement with the lower stationary contact after a particular period of time dependent upon an adjustable delay 58. The return of the movable contact of the switch 43 into engagement with the lower stationary contact in turn causes the relay 29 to be energized for actuating the movable contacts of the switches 26 and 28 into engagement with the upper stationary contacts. A continuous circuit is then established which includes a variable autotransformer generally indicated at 60, the switch 54 and rectifier 24, the switch 26, the inductive filter 50, the torque motor 20 and the switch 28.

The voltage from the variable autotransformer 60 is higher than that provided by the variable autotransformer 22 to overcome the starting friction and inertia of the starwheel 14 and prime of bottles. As a result, the motor 20 is energized to accelerate the starwheel 14 and produce a movement of the containers in the prime illustrated in FIG. 3 before the containers 56 reach the prime. This causes the containers in the prime to receive a progressive velocity from the operation of the motor 20 as the containers 56 on the conveyor line move past the sensor 32 and toward the starwheel 14. This produces a graceful melding of the containers 56 moving toward the starwheel with the containers 49 in the prime. This graceful melding minimizes impact between the containers and prevents breakage and jamming of the containers.

The relay 52 is constructed to be energized only for a particular period of time dependent upon the operation of an adjustable delay 62. This period of time is preselected to provide a sufficient acceleration of the containers 49 in the prime for producing a graceful melding of these containers with the containers 56 moving past the sensor 32 toward the containers in the prime. At the end of this preselected period, the relay 52 is de-energized and the movable contact of the switch 54 is returned into engagement with the left stationary contact of the switch in FIG. 4. This causes a direct voltage to be introduced to the torque motor 20 from the variable autotransformer 22 of a magnitude to overcome the running friction of the starwheel 14. The system then operates in its steady state condition where the starwheel is effectively freewheeling so that it is rotated in accordance with the movement of the containers on the conveyor line. The system then continues in this mode of operation until an interruption occurs, as previously explained, in the movement of the containers on the conveyor line past the sensor 32. The variable autotransformers are used to allow the voltages of the various functions to be adjusted to suit the line conditions.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for conveying containers,
conveyor means for guiding movement of the containers in a particular direction,
a rotatable starwheel for receiving in sequence the containers moving in a particular direction,
means disposed on the starwheel for transferring the containers in sequence from the conveyor means to the rotatable starwheel, and
means operatively coupled to the starwheel for imposing a constant torque on the starwheel in a direction and with a magnitude to overcome the running friction of the starwheel and to provide the starwheel with freewheeling properties regardless of the force imposed upon the starwheel by the containers being transferred to the starwheel.

2. The combination set forth in claim 1 wherein
the torque-imposing means constitutes a torque motor having properties of generating a constant torque while operating at speeds between a stationary disposition of the starwheel and speeds corresponding to those at which the containers are being conveyed by the conveyor means to the starwheel.

3. In combination for conveying containers,
a starwheel constructed to retain the containers in the plurality and rotatable to receive the containers at a first position and to release the containers at a second position displaced from the first position,
conveyor means constructed to direct the containers in sequence to the first position for transfer to the starwheel and to receive the containers released by the starwheel at the second position,
means operatively coupled to the starwheel for facilitating the transfer of the containers from the conveyor means to the starwheel at the first position and the transfer of the containers from the starwheel to the conveyor means at the second position, and
first control means operatively coupled to the starwheel and constructed to impose a constant torque on the starwheel, over a range of speeds between standstill and the speed of conveyance of the containers by the conveyor means, but not to exceed the speed of the conveyor means in a direction and with a selected magnitude to minimize container impact, prevent container jamming and provide smooth and unimpeded flow of containers on the conveyor means.

4. The combination set forth in claim 3 wherein
the first control means includes a torque motor constructed to operate between standstill and the speed of conveyance of the containers by the conveyance means without becoming overheated while delivering a constant rotary force.

5. The combination set forth in claim 4, including,
detector means for detecting an interruption of the movement of the containers by the conveyor means, and
second control means responsive to the operation of the detector means for reversing the direction of operation of the torque motor to impose a force in an opposite direction on the starwheel to brake the starwheel when an interruption occurs in the movement of the containers past the detector means.

6. The combination set forth in claim 5, including,
means responsive to the operation of the detector means for delaying the reversal in the direction of operation of the torque motor for a particular period of time when an interruption occurs in the conveyance of the containers.

7. the combination set forth in claim 6, including,
third control means responsive to the initiation of a new movement of containers by the conveyor means past the detector means for instituting an operation of the torque motor for a particular period of time, in a direction for overcoming the inertia and starting friction of the starwheel system and with a magnitude greater than that produced to overcome the running friction, to produce an initial acceleration of the starwheel by the torque motor.

8. The combination set forth in claim 7, including,
fourth control means responsive to the operation of the third control means for a particular period of time for initiating the operation of the first means.

9. In combination for conveying containers,
starwheel means constructed to retain the containers in the plurality and rotatable to receive the containers at a first position and to release the containers at a second position displaced from the first position,
conveyor means constructed to direct the containers in sequence to the first position for transfer to the starwheel means and to receive the containers released by the starwheel means at the second position,
control means directly coupled to the starwheel means for producing a constant rotary force upon the starwheel means,
detector means positioned relative to the conveyor means and the starwheel means for detecting the movement of the containers along the conveyor means to the starwheel means,
first means for energizing the control means to impose a constant rotary force on the starwheel means in a direction and with a magnitude to overcome the running friction of the starwheel means, and second means responsive to the operation of the detector means in detecting an interruption in the conveyance of the containers for reversing the operation of the control means to obtain the operation of the control means as a brake on the starwheel means.

10. The combination set forth in claim 9, including, third means responsive to the operation of the detector means for initiating an operation of the control means in the same direction as the first means and with a magnitude greater than that provided by the third means when the conveyor means initiates again the conveyance of the containers.

11. The combination set forth in claim 10 wherein the third means is prepared for operation upon the operation of the second means and the third means is energized when the detector means detects the movement of the containers along the conveyor means.

12. the combination set forth in claim 9 wherein the second means includes means for delaying for a particular period of time the operation of the second means in braking the starwheel means after the detector means has detected an interruption in the conveyance of the containers.

13. the combination set forth in claim 10 wherein the third means includes means for producing a constant rotary force on the starwheel means greater than that imposed by the first means to provide an acceleration of the containers in the prime toward a velocity approaching that provided by the conveyor means on the containers being conveyed toward the starwheel means.

14. The combination set forth in claim 13 wherein the second means includes means for operating the control means to brake the starwheel to standstill when a particular number of containers constituting the prime are on the conveyor means between the detector means and the starwheel means.

15. The combination set forth in claim 14 wherein the first means and the third means operate to provide a transfer of containers from the conveyor means to the starwheel means at a rate less than that producing a jamming of the containers.

16. In combination for conveying containers, conveyor means constructed to convey the containers, starwheel means constructed to receive the container means for processing of the containers and to return the containers to the conveyor means after such processing.

torque motor means operatively coupled to the starwheel means to produce a constant torque on the starwheel means, first means operatively coupled to the torque motor means for initially producing a first force on the torque motor means for a particular period of time when the conveyance of the containers by the container means is initiated, and second means operatively coupled to the torque means for thereafter producing on the torque motor means a second force less than the first force and substantially equal to that required to provide a freewheeling of the starwheel means.

17. The combination set forth in claim 16 wherein the torque motor means comprises a DC motor having a rotor and a stator and including permanent magnet in the stator and large windings on the rotor, the large windings being magnetically coupled through air to the permanent magnets on the stator.

18. The combination set forth in claim 17 wherein detector means are disposed relative to the conveyor means at a position upstream from the transfer of containers from the conveyor means to the starwheel means to detect the movement of the containers on the conveyor means past the starwheel means and wherein the first means are responsive to the operation of the detector means in detecting the movement of the containers on the conveyor means past the starwheel means.

19. The combination set forth in claim 16, including, third means for producing a third force in an opposite direction to the second force and with substantially the same magnitude as the first force to brake the starwheel means.

20. The combination set forth in claim 18 wherein third means are included for producing a third force in an opposite direction to the second force and with substantially the same magnitude as the first force to brake the starwheel means and wherein the third means is operative to produce the braking force a particular period of time after the operation of the detector means in indicating the interruption in the conveyance of the containers on the conveyor means past the detector means.

* * * * *